No. 795,914. PATENTED AUG. 1, 1905.
W. S. HUTCHINSON.
FIRE SCREEN.
APPLICATION FILED FEB. 17, 1905.
2 SHEETS—SHEET 1.
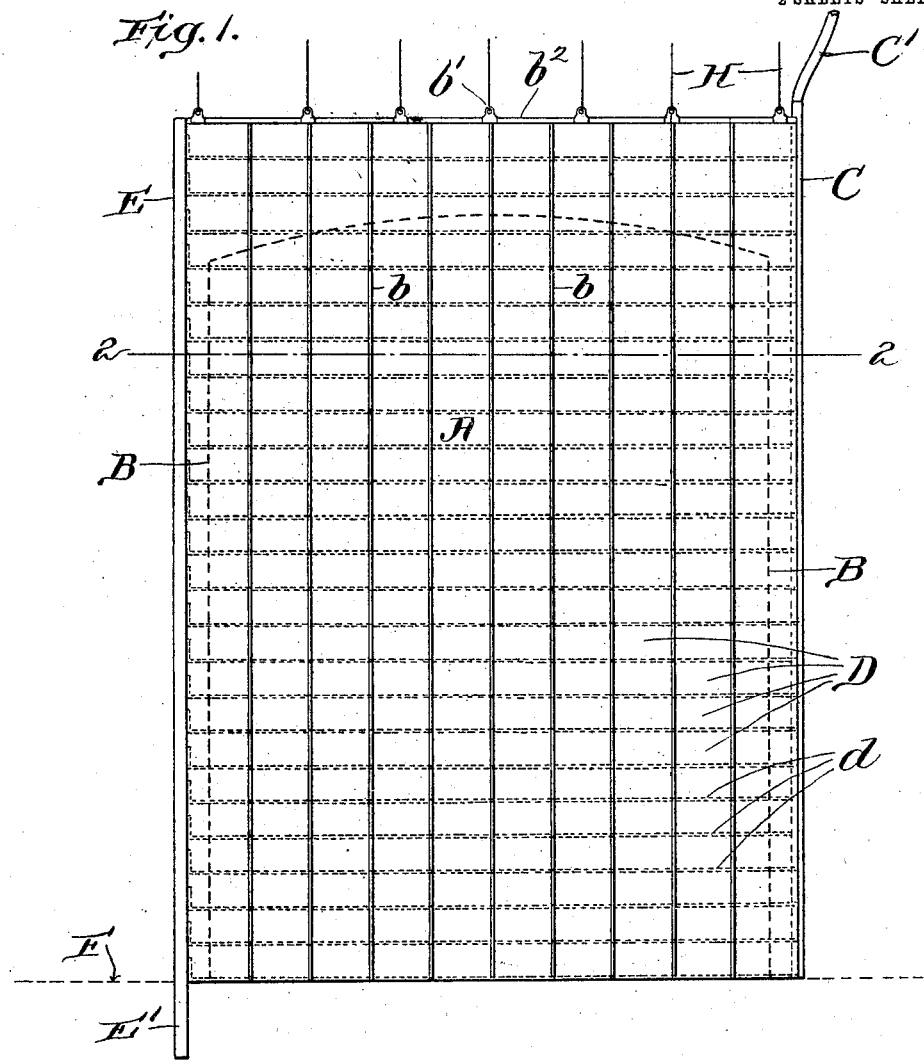
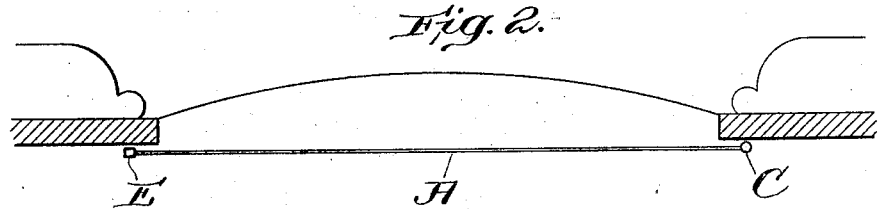
Witnesses:
Inventor:
William Spencer Hutchinson
by Roberts & Mitchell
Attorneys No. 795,914. PATENTED AUG. 1, 1905.
W. S. HUTCHINSON.
FIRE SCREEN.
APPLICATION FILED FEB. 17, 1905.
2 SHEETS—SHEET 2.
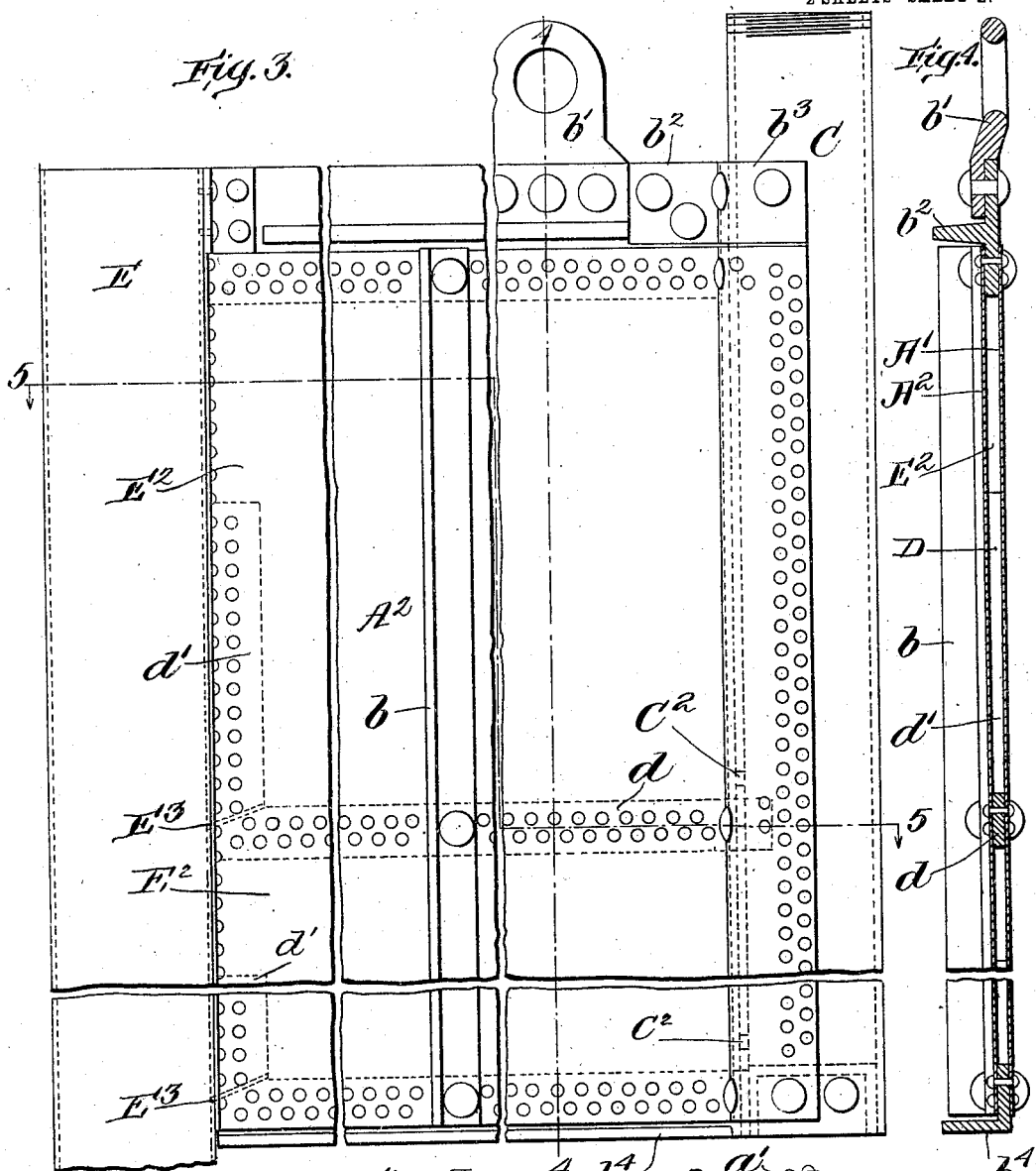
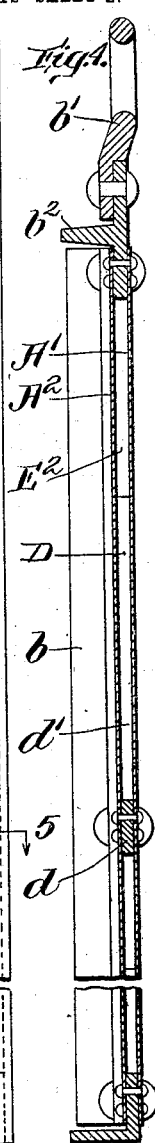
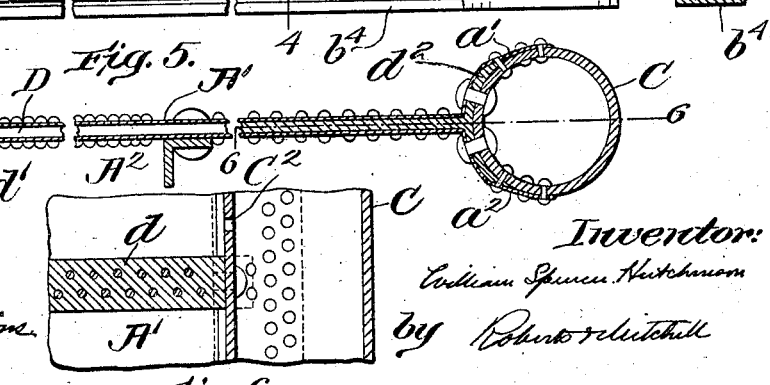
Witnesses:
Inventor:
Attorneys.

UNITED STATES PATENT OFFICE.

WILLIAM SPENCER HUTCHINSON, OF BOSTON, MASSACHUSETTS.

FIRE-SCREEN.

No. 95,914.      Specification of Letters Patent.      Patented Aug. 1, 1905.

Application filed February 17, 1905. Serial No. 245,985.

*To all whom it may concern:*

Be it known that I, WILLIAM SPENCER HUTCHINSON, a citizen of the United States, and a resident of Boston, in the county of Suffolk and State of Massachusetts, have invented new and useful Improvements in Fire-Screens, of which the following is a specification.

My invention relates to the construction and operation of fire-protective apparatus; and it consists in a new and improved screen or partition wherein the circulation of cooling fluid, such as water, prevents the temperature of the screen itself from rising to a dangerous point, and consequently protects the space on one side of the screen from the effects of fire to which the screen is exposed on the other side.

In the drawings hereto annexed, which illustrate a preferred form of my invention as applied to the construction of a protective curtain for theaters and the like, Figure 1 is a vertical elevation of my improved fire-protective screen, showing generally its construction and mode of operation. Fig. 2 is a horizontal cross-section taken at the line 2 2 of Fig. 1. Fig. 3 is a vertical elevation, on a different scale, of the fire-screen shown in Fig. 1, showing the detailed structural features of the said screen. Fig. 4 is a vertical cross-section of Fig. 3 at the line 4 4. Fig. 5 is a horizontal cross-section of Fig. 3 at the line 5 5; and Fig. 6 is a vertical cross-section of a portion of Fig. 5, taken at line 6.

In the aforesaid drawings I have adopted for illustration a theater-curtain as a type of fire-resisting screen which affords the best opportunity for expression and embodiment of my inventions and improvements.

Fire-resisting screens composed of refractory material in whole or in part, such as asbestos-fiber screens interwoven with and reinforced by metal wires, while they are resistant to the action of heat they do not exercise any temperature-reducing function and in emergencies when fire on one side of such a refractory screen becomes intense the tendency of such a screen is to disintegrate, especially by the fusion and consequent breakage of the metallic reinforcements which are necessary in order to give the screen as a whole proper tensile strength. I am aware also that fire-resistant screens have been contrived wherein the screen or curtain is composed of porous material, such of cloth, into and over which water is directed, so that the exposed surface of the cloth is like a thoroughly-drenched blanket, whereof the temperature is kept reduced by the rapid evaporation of the water running over the surface or oozing between the interstices. Such arrangements as these also have their disadvantages as well as their merits. If a screen thus constructed is of a considerable vertical height, its weight when augmented by the water employed to drench it becomes a severe if not a destructive strain upon the upper portions of the screen or curtain itself, and, moreover, as it is indispensable that water used with such a curtain shall escape and flow over and upon its surface and in order to make the screen effective the water must be abundantly supplied for this purpose, the water damage to the building where the screen is used would be considerable and very likely disproportionate to the actual necessities of the situation.

My invention provides means whereby the great specific heat of water is taken advantage of without involving the water damage to the use of an uncontrolled and unconfined large quantity of water. My invention involves, moreover, a screen construction wherein a screen of very large extent may be filled with water and have water circulating through it, but, nevertheless, may be constructed of light materials. The pressure stresses due to a contained body of water of considerable vertical height are avoided by the construction peculiar to my invention, and the fire-protective qualities of the screen are brought to the highest possible efficiency.

In Figure 1, A is the fire-protective screen or curtain shown as lowered behind the proscenium-opening of a theater, which is indicated by a dotted line at B. This screen consists of two substantially continuous thin sheets $A'$ $A^2$ of metal, such as steel, Fig. 4, the said sheets being stiffened vertically by angle-irons or webs $b$, which are externally secured to one of the sheets, as $A^2$, and likewise stiffened internally by transverse bars or partitions $d$, which divide the entire space inclosed between the sheets $A'$ $A^2$ into superposed substantially horizontal compartments D. Pipes C E are secured to the vertical edges of the curtain A, the pipe C serving as the supply-pipe and the pipe E as a discharge-pipe for the screen. The subdivision of the screen-space into the horizontal compartments D prevents the hydrostatic pressure of water introduced into the screen-space from accumulating progressively toward the lower edge of the screen.

Ears $b'$, secured to the upper angle or frame piece $b^2$ of the screen, serve for the attachment of suspending-cables H, which pass to suitable pulleys and thence preferably to counterweights. The screen may thus be raised or lowered either by hand or by a suitable application of power like an ordinary curtain.

The details of construction are shown in Figs. 3 to 6, inclusive. The pipes C and E, respectively, serve as the vertical edge stiffeners for the screen, and the horizontal partition-bars $d$ are secured to pipe C, as by rivets, in the manner indicated in Fig. 5. The pipe C is therein shown as a cylindrical pipe, and the bars $d$ terminate in spanners $d^2$, which embrace the pipe C on one side. The metal sheets $A'$ $A^2$ are riveted to the horizontal bars $d$ and at the edges of the screen are carried out at $a'$ $a^2$, so that they embrace and are riveted to the sides of the pipe C, so as to make a tight joint. On the other side of the curtain the pipe E, which is here shown as made of sheet metal and square in cross-section, is also riveted to the metal sheets $A'$ $A^2$. Referring again to Fig. 3, at points preferably just above each horizontal bar $d$ the pipe C is perforated at $C^2$. At the opposite side of the screen the upright separator-bars $d'$ extend from the horizontal separator-bars $d$ up toward but not to the horizontal bars $d$ next above. Thus in each compartment D an opening $E^2$ is left communicating between the screen-space and the discharge-pipe E. Small "bleeders" or drain-apertures $E^3$ are made to drain the compartments D into pipe E. At suitable intervals angle-irons $b$ are riveted to the outside of one of the screen-plates and preferably also through the horizontal bars $d$. At the top of the screen the T-iron $b^2$ extends from edge to edge of the screen and is secured by rivets to the screen-sheets $A'$ $A^2$ and to the vertical stiffening-bars $b$. The hangers or ears $b'$ are secured by rivets to the flange of the T-iron $b^2$. This T-iron is preferably also provided with a suitably-formed end plate $b^3$, which is secured to the pipe C. The pipe $E'$ projects a convenient distance below the lower edge of the screen and when the screen is lowered passes through a proper aperture in the floor F of the stage, and, if desired, the end $E'$ of this pipe E may discharge its contents to a drain so that the water flowing from the screen may be carried out of the building without doing damage thereto. The angle-iron $b^4$ extends along the bottom edge of the curtain and is riveted to the screen-sheets and to the vertical stiffeners $b$.

In order to avoid the delays consequent upon joining pipe-couplings, I prefer to provide the pipe C with a flexible water connection $C'$ of convenient length to enable the curtain or screen to be hoisted or lowered to its fullest extent without disturbing the connection with the water-main. Flexible spiral copper tubings can be obtained which will serve admirably for this purpose and be free from the dangers which would attend the use of canvas or other destructible hose.

The operation of my improved fire-resistant screen is as follows: The screen being lowered or otherwise being moved into place over the opening which it is designed to bar, water is turned on from the connection $C'$ into the pipe C and flows when the pipe C is full simultaneously through all the openings $C^2$ and into the horizontal interposed compartments D. The sheets $A'$ $A^2$ are by design and preference placed very close together, so that a small quantity of water is required to fill each compartment D. As the water rises in each of these compartments and reaches the openings $E^2$ it flows from these openings; but as the head determining such outward flow is much less than the head from the water-main which determines the inward flow through the apertures $C^2$ a very much larger opening is required at $E^2$ than at $C^2$. The relative proportions of these two openings should be determined from a knowledge of the head of water available in the pipe $C^2$. Under ordinary conditions of city service a water-inlet $C^2$, which is five-sixteenth inches by seven-sixteenth inches will deliver water as fast as it will be carried out of an opening $E^2$ six inches high, the space between the screen-sheets $A'$ $A^2$ being five-sixteenths of an inch. Thus each compartment is kept substantially full of water; but in no compartment is the head of water more than is due to the actual height of the compartment. In most instances a height of eighteen inches will be found suitable for the compartments D, and the pressure upon the sides of the screen will be no greater at the bottom of the screen than it is at the top.

As the expedition with which such fire apparatus can be bought into complete and effective action is nearly always an important merit, I prefer to arrange the water distribution as shown in the drawings and to send the water simultaneously, or nearly so, through all of the horizontal compartments D in parallel, delivering simultaneously to the drain-pipe E. The construction may, however, be varied to suit certain conditions without departing from my invention by having the horizontal distribution of water successive through a portion of or all the horizontal compartments D. It should be remembered, however, that this gives an opportunity for an accumulative heating of water, and the essential lightness of construction would render any steam-pressure in the compartments destructive of the screen and of its efficiency. When the occasion for use of this fire-screen has passed, the water is shut off at the main connection and the bleeders E³ drain the compartments D.

What I claim, and desire to secure by Letters Patent, is—

1. A fire-resisting screen comprising two vertical sheet-metal walls, substantially horizontal partitions dividing the included space into separate horizontally-disposed compartments, and means to admit cooling fluid to and withdraw it from said compartments.

2. A fire-resisting screen comprising two vertical sheet-metal walls, substantially horizontal partitions dividing the included space into separate horizontal compartments, an inlet to and outlet from each compartment, and means to circulate cooling fluid through the compartments in parallel.

3. A fire-resisting screen comprising two vertical sheet-metal walls, substantially horizontal partitions dividing the included space into separate horizontally-disposed compartments, a supply-pipe secured to one edge of the screen and openings therefrom into the said compartments, and outlets from the said compartments.

4. A fire-resisting screen comprising two vertical sheet-metal walls, substantially horizontal partitions dividing the included space into separate horizonally-disposed compartments, stiffening-ribs externally secured to the screen-wall, a supply-pipe secured to one edge of the screen, and a discharge-pipe secured to an opposite edge, inlets to the screen-compartments from the supply-pipe, and outlets therefrom to the discharge-pipe.

5. A fire-resisting screen comprising sheet-metal walls, separated by substantially horizontal partitions dividing the included space into horizontally-disposed compartments, angle-iron stiffeners externally secured to the screen-wall and extending vertically from edge to edge thereof, and similar horizontal stiffeners at top and bottom of the screen; inlets to and outlets from the said compartments, a supply-pipe at one vertical edge and a discharge-pipe at the other.

6. A fire-resisting screen comprising sheet-metal walls, separated by substantially horizontal partitions dividing the included space into horizontally-disposed compartments, angle-iron stiffeners externally secured to the screen-wall and extending vertically from edge to edge thereof, and similar horizontal stiffeners at top and bottom of the screen; inlets to and outlets from the said compartments, a supply-pipe at one vertical edge and a discharge-pipe at the other, and bleeder-outlets from the compartments.

Signed by me at Boston, Massachusetts, this 8th day of February, 1905.

WILLIAM SPENCER HUTCHINSON.

Witnesses:
 JOSEPH T. BRENNAN,
 GRACE E. GIBBONS.